(12) United States Patent
Kiehtreiber et al.

(10) Patent No.: US 8,880,897 B2
(45) Date of Patent: *Nov. 4, 2014

(54) METHOD AND APPARATUS FOR INCREMENTAL CODE SIGNING

(71) Applicant: Apple Inc., Cupertino, CA (US)

(72) Inventors: Peter Kiehtreiber, Campbell, CA (US); Michael Brouwer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,957

(22) Filed: Dec. 21, 2012

(65) Prior Publication Data

US 2013/0111216 A1 May 2, 2013

Related U.S. Application Data

(63) Continuation of application No. 11/458,992, filed on Jul. 20, 2006, now Pat. No. 8,341,422, which is a continuation of application No. 10/666,847, filed on Sep. 18, 2003, now Pat. No. 7,103,779.

(51) Int. Cl.
*H04L 29/06* (2006.01)
*H04L 9/32* (2006.01)
*G06F 21/50* (2013.01)
*G06F 21/64* (2013.01)

(52) U.S. Cl.
CPC .............. *G06F 21/50* (2013.01); *H04L 9/3247* (2013.01); *H04L 9/3239* (2013.01); *H04L 2209/38* (2013.01); *G06F 21/64* (2013.01)
USPC ........... 713/187; 713/160; 713/161; 713/176; 726/22; 726/26

(58) Field of Classification Search
CPC ...... G06F 21/50; H04L 9/3239; H04L 9/3247
USPC ................. 713/160, 161, 176, 181, 187, 190; 726/22, 26
See application file for complete search history.

(56) References Cited

U.S. PATENT DOCUMENTS

| 5,454,000 A | 9/1995 | Dorfman |
| 5,625,693 A * | 4/1997 | Rohatgi et al. ................ 713/187 |

(Continued)

FOREIGN PATENT DOCUMENTS

| AU | 2004275264 | 3/2005 |
| AU | 2009233685 | 11/2009 |

(Continued)

OTHER PUBLICATIONS

International Search Report and Written Opinion for PCT/US2004/029470, Dec. 27, 2005 (Issuance date), Apple Inc.

(Continued)

*Primary Examiner* — Justin T Darrow
(74) *Attorney, Agent, or Firm* — Adeli LLP

(57) ABSTRACT

The present invention discloses a method for quickly and easily authenticating large computer program. The system operates by first sealing the computer program with digital signature in an incremental manner. Specifically, the computer program is divided into a set of pages and a hash value is calculated for each page. The set of hash values is formed into a hash value array and then the hash value array is then sealed with a digital signature. The computer program is then distributed along with the hash value array and the digital signature. To authenticate the computer program, a recipient first verifies the authenticity of the hash value array with the digital signature and a public key. Once the hash value array has been authenticated, the recipient can then verify the authenticity of each page of the computer program by calculating a hash of a page to be loaded and then comparing with an associated hash value in the authenticated hash value array. If the hash values do not match, then execution may be halted.

20 Claims, 5 Drawing Sheets

(56) References Cited

U.S. PATENT DOCUMENTS

| | | | |
|---|---|---|---|
| 5,673,316 A | 9/1997 | Auerbach et al. | |
| 6,092,147 A | 7/2000 | Levy et al. | |
| 6,202,203 B1 | 3/2001 | Ng | |
| 6,263,348 B1 | 7/2001 | Kathrow et al. | |
| 6,324,637 B1 | 11/2001 | Hamilton | |
| 6,560,706 B1 | 5/2003 | Carbajal et al. | |
| 6,658,556 B1 | 12/2003 | Arimilli et al. | |
| 6,785,815 B1 | 8/2004 | Serret-Avila et al. | |
| 6,954,747 B1 | 10/2005 | Wang et al. | |
| 6,983,262 B1 | 1/2006 | Ito | |
| 6,986,046 B1 | 1/2006 | Tuvell et al. | |
| 7,103,779 B2 | 9/2006 | Kiehtreiber et al. | |
| 7,356,815 B2 | 4/2008 | Sarfati et al. | |
| 7,406,603 B1 | 7/2008 | MacKay et al. | |
| 7,430,670 B1 | 9/2008 | Horning et al. | |
| 7,461,406 B2 | 12/2008 | Pelly et al. | |
| 7,529,929 B2 | 5/2009 | Asokan et al. | |
| 7,543,336 B2 | 6/2009 | Lampson et al. | |
| 7,729,495 B2 | 6/2010 | Lee et al. | |
| 8,341,422 B2 | 12/2012 | Kiehtreiber et al. | |
| 8,364,965 B2 | 1/2013 | Farrugia et al. | |
| 2001/0034839 A1* | 10/2001 | Karjoth et al. | 713/190 |
| 2002/0184046 A1 | 12/2002 | Kamada et al. | |
| 2002/0194484 A1 | 12/2002 | Bolosky et al. | |
| 2003/0084298 A1 | 5/2003 | Messerges et al. | |
| 2003/0126453 A1 | 7/2003 | Glew et al. | |
| 2003/0131239 A1 | 7/2003 | Greene et al. | |
| 2003/0185395 A1 | 10/2003 | Lee et al. | |
| 2004/0030909 A1 | 2/2004 | Sako et al. | |
| 2004/0064457 A1 | 4/2004 | Zimmer et al. | |
| 2004/0098599 A1 | 5/2004 | Bentley | |
| 2005/0005112 A1 | 1/2005 | Someren | |
| 2005/0038999 A1 | 2/2005 | Pelly | |
| 2005/0071274 A1 | 3/2005 | Pfaff et al. | |
| 2005/0089160 A1 | 4/2005 | Crispin et al. | |
| 2005/0166264 A1 | 7/2005 | Yamada et al. | |
| 2005/0277403 A1 | 12/2005 | Schmidt et al. | |
| 2006/0259781 A1 | 11/2006 | Saeki et al. | |
| 2007/0234070 A1 | 10/2007 | Horning et al. | |
| 2013/0145167 A1 | 6/2013 | Farrugia et al. | |

FOREIGN PATENT DOCUMENTS

| | | |
|---|---|---|
| CA | 2632076 | 3/2005 |
| CA | 2531363 | 3/2009 |
| CN | 1146122 | 3/1997 |
| CN | 1150762 C | 5/2004 |
| EP | 0328232 | 5/1995 |
| EP | 0752786 | 1/1997 |
| EP | 0798892 | 10/1997 |
| EP | 1076301 | 2/2001 |
| EP | 1496419 | 1/2005 |
| EP | 1695169 | 8/2006 |
| EP | 1739591 | 1/2007 |
| EP | 1835432 | 9/2007 |
| EP | 2284754 | 2/2011 |
| EP | 2284755 | 2/2011 |
| EP | 2634959 | 9/2013 |
| EP | 2634960 | 9/2013 |
| JP | H10-040100 | 2/1998 |
| JP | H10-282882 | 10/1998 |
| JP | 2001-034470 | 2/2001 |
| JP | 2001-147826 | 5/2001 |
| JP | 2001-147898 | 5/2001 |
| JP | 2002-353960 | 12/2002 |
| JP | 2003-202929 | 7/2003 |
| JP | 2003-524252 | 8/2003 |
| JP | 2004-514214 | 5/2004 |
| WO | WO 98/26535 | 6/1998 |
| WO | WO 00/49764 | 8/2000 |
| WO | WO 01/10076 | 2/2001 |
| WO | WO 01/63385 | 8/2001 |
| WO | WO 02/41147 | 5/2002 |
| WO | WO 2004/032328 | 4/2004 |
| WO | WO 2005/029223 | 3/2005 |
| WO | WO 2007/106831 | 9/2007 |

OTHER PUBLICATIONS

International Preliminary Report on Patentability and Written Opinion for PCT/US2004/029470, Mar. 21, 2006 (Issuance date), Apple Inc.

International Search Report PCT/US2007/063919, Aug. 9, 2007 (Mailing date), Apple Inc.

Written Opinion for PCT/US2007/063919, Sep. 15, 2008 (Issuance date), Apple Inc.

International Preliminary Report on Patentability and Written Opinion for PCT/US2007/063919, Sep. 16, 2008 (Issuance date), Apple Inc.

Portions of prosecution history of AU2004275264, Nov. 5, 2009 (mailing date), Apple Inc.

Portions of prosecution history of AU2009233685, Aug. 11, 2011 (mailing date), Apple Inc.

Portions of prosecution history of CA2531363, Jul. 8, 2008 (mailing date), Apple Inc.

Portions of prosecution history of CA2632076, Jan. 15, 2014 (mailing date), Apple Inc.

Portions of prosecution history of EP04783639.0, Oct. 4, 2011 (mailing date), Apple Inc.

Portions of prosecution history of EP13169962.1, Sep. 10, 2013 (mailing date), Apple Inc.

Portions of prosecution history of EP13169965.4, Sep. 12, 2013 (mailing date), Apple Inc.

Portions of prosecution history of EP07104227.9, Jan. 2, 2014 (mailing date), Apple Inc.

Portions of prosecution history of EP10183083.4, Aug. 9, 2012 (mailing date), Apple Inc.

Portions of prosecution history of EP10183093.3, Aug. 9, 2012 (mailing date), Apple Inc.

Bellare, M., et al., "Incremental Cryptography: The Case of Hashing and Signing," Advances in Cryptology (Crypto), Proceedings of the Annual International Cryptology Conference, Aug. 21-25, 1994, pp. 1-19, Santa Barbara, CA.

Garfinkel, Simson, et al., "Web Security, Privacy & Commerce, 2nd Edition", Jan. 2002, 5 pages, O'Reilly Media, Inc., Sebastopol, CA.

Schneier, Bruce, "Applied Cryptography, Second Edition: Protocols, Algorithms, and Source Code in C," 1996, John Wiley & Sons, Inc., section 18.7, 6 pages.

* cited by examiner

METHOD AND APPARATUS FOR INCREMENTAL CODE SIGNING

CLAIM OF BENEFIT TO PRIOR APPLICATIONS

This application is a continuation application of U.S. patent application Ser. No. 11/458,992, filed Jul. 20, 2006, now issued as U.S. Pat. No. 8,341,422. U.S. patent application Ser. No. 11/458,992 is a continuation of U.S. patent application Ser. No. 10/666,847, filed Sep. 18, 2003, now issued as U.S. Pat. No. 7,103,779. U.S. patent application Ser. No. 11/458,992, now issued as U.S. Pat. Nos. 8,341,422 and 7,103,779, are incorporated herein by reference.

BACKGROUND OF THE INVENTION

1. Field of the Invention

The present invention relates to the field of computer security. In particular, the present invention discloses a system for verifying that an unauthorized party has not tampered with computer program code.

2. Description of the Related Art

Computer security is one of the most pressing problems facing computer software makers. With the rise in popularity of the Internet, nearly every personal computer system is available on the Internet at one point or another. This great connectivity has provided many benefits to personal computer users. However, it has also provided a new host of problems to computer users. One of the biggest problems has been the rise of Internet transmitted viruses, worms, Trojan horses, and other malevolent programs.

Rogue computer programmers, sometimes known as "crackers", often attempt to break into computer systems to steal information or make unauthorized changes. Crackers use many different types of attacks in attempts to break into a computer system. Common methods employed by computer crackers include Trojan horses (a seemingly benign computer program that has a hidden agenda), a computer virus (a piece of software that replicates itself from within a host program), a computer worm (a piece of software that replicates itself across a computer network), and social engineering (Deceiving a person with authorization codes into giving out those authorized codes).

These rogue computer programmers often alter existing legitimate programs by adding program code to perform unauthorized functions. By placing such authorized program code within legitimate programs, the rogue computer programmer thereby hides the unauthorized program code. The unauthorized code may thus dwell within a person's personal computer system without the person's knowledge for a long time. The unauthorized program code may destroy valuable data, waste computing resources (CPU cycles, network bandwidth, storage space, etc.), or pilfer confidential information.

In order to protect legitimate programs from such unauthorized adulteration, some software manufacturers generate a checksum of the program code. The checksum is a value calculated using the program code as input value such that each different computer program tends to have a different checksum value. The software manufacturer then digitally "signs" the checksum with a private key encryption key. Before running the computer program code, a user should then authenticate the program code. Specifically, the user has the personal computer system compute a checksum of the program code and then the computed checksum values is compared with the checksum calculated by the software manufacturer after decrypting it with the software manufacturer's public key. If the two checksums match, then the computer program is presumed to be authentic.

These existing checksum based protection systems have been known to work relatively well. However, these existing checksum based protection systems can take a long time to authenticate large computer programs. Therefore, it would be desirable to provide a system faster system for authenticating large computer programs.

SUMMARY OF THE INVENTION

The present invention discloses a method for quickly and easily authenticating large computer program. The system operates by first sealing the computer program with digital signature in an incremental manner. Specifically, the computer program is divided into a set of pages and a hash value is calculated for each page. The set of hash values is formed into a hash value array and then the hash value array is then sealed with a digital signature. The computer program is then distributed along with the hash value array and the digital signature. To authenticate the computer program, a recipient first verifies the authenticity of the hash value array with the digital signature and a public key. Once the hash value array has been authenticated, the recipient can then verify the authenticity of each page of the computer program by calculating a hash of a page to be loaded and then comparing with an associated hash value in the authenticated hash value array. If the hash values do not match, then execution may be halted.

Other objects, together with the foregoing are attained in the exercise of the invention described and illustrated in the accompanying embodiments and drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Notation and Nomenclature

Figure 1:
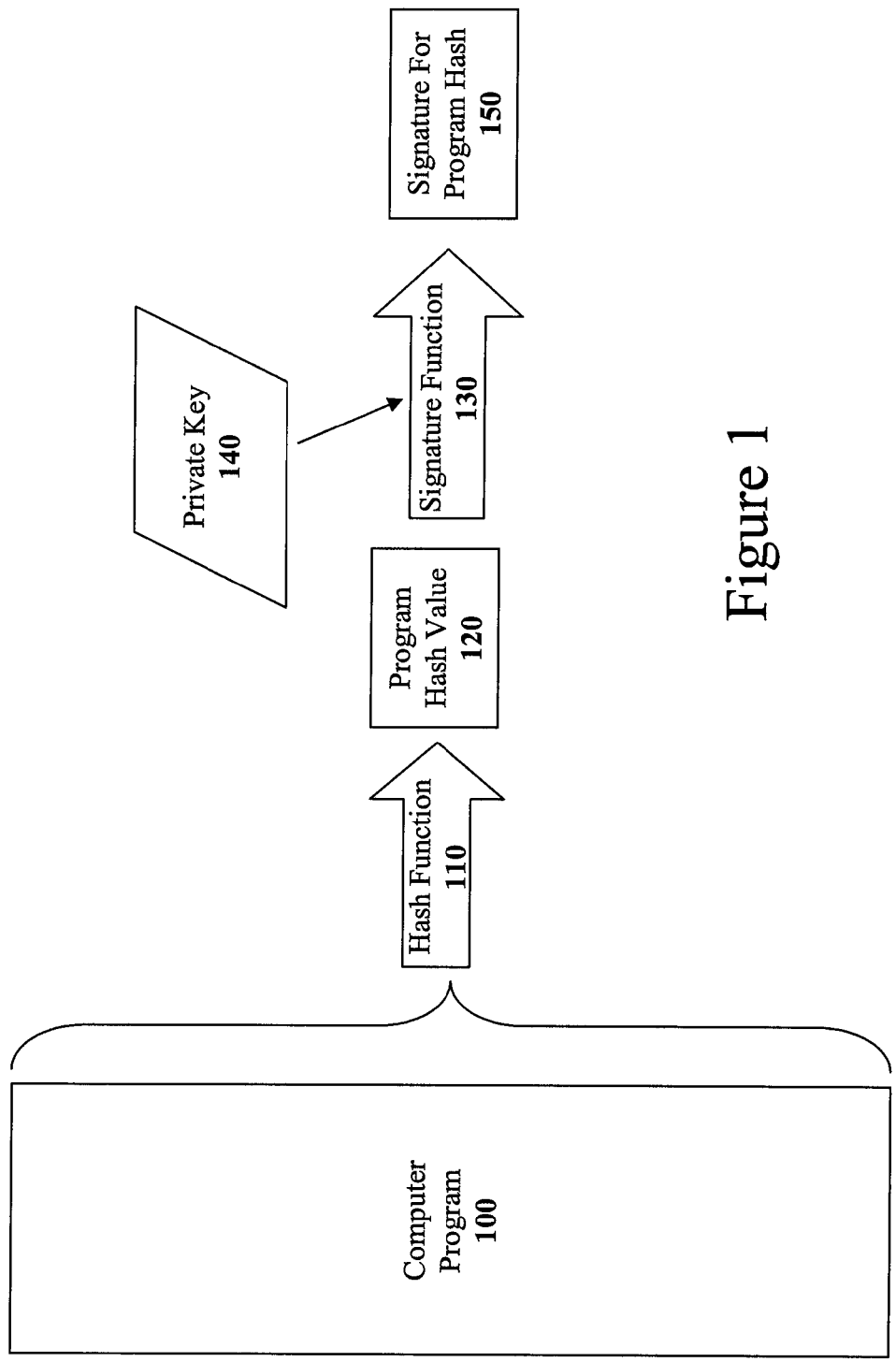
FIG. 1 illustrates a conceptual diagram describing how a computer program can be sealed with a digital signature.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following is presented largely in terms of procedures, steps, logic blocks, processing, and other symbolic representations that describe data processing devices coupled to networks. These process descriptions and representations are the means used by those experienced or skilled in the art to most effectively convey the substance of their work to others skilled in the art. The present invention is a method and apparatus for providing a mobile subscriber visual interface to customer care and billing systems. The method along with the apparatus, described in detail below, is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in computer systems or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Computer Program Security with Digital Signatures

To protect a computer program from unauthorized tampering, a software manufacturer may create a special "seal" for the computer program that should be tested before the program is executed. If the seal or the computer program code has been tampered with, then the test will fail such that the program will then refuse to execute.

A common method of creating such a seal is to use well-known "public key" encryption technology. Such a system that uses public key encryption technology will be described with reference to FIGS. 1 and 2.

Digitally Sealing a Computer Program

Referring now to the drawings, in which like numerals refer to like parts throughout the several views, FIG. 1 conceptually illustrates a process for creating a digital seal or digital signature for a computer program 100. First, a hash is calculated for the entire computer program 100 using a hash function 110 to calculate a program hash value 120. The program hash value 120 is a small representation derived from the computer program 100 such as a checksum. The program hash value 120 is then digitally signed with the private key 140 of a trusted entity using a digital signature function 130 to create a digital signature for the program hash 150. The digital signature for the program hash 150 is the digital seal (or digital signature) that accompanies the program when it is distributed.

Verifying the Authenticity of a Digitally Sealed Computer Program

Figure 2:
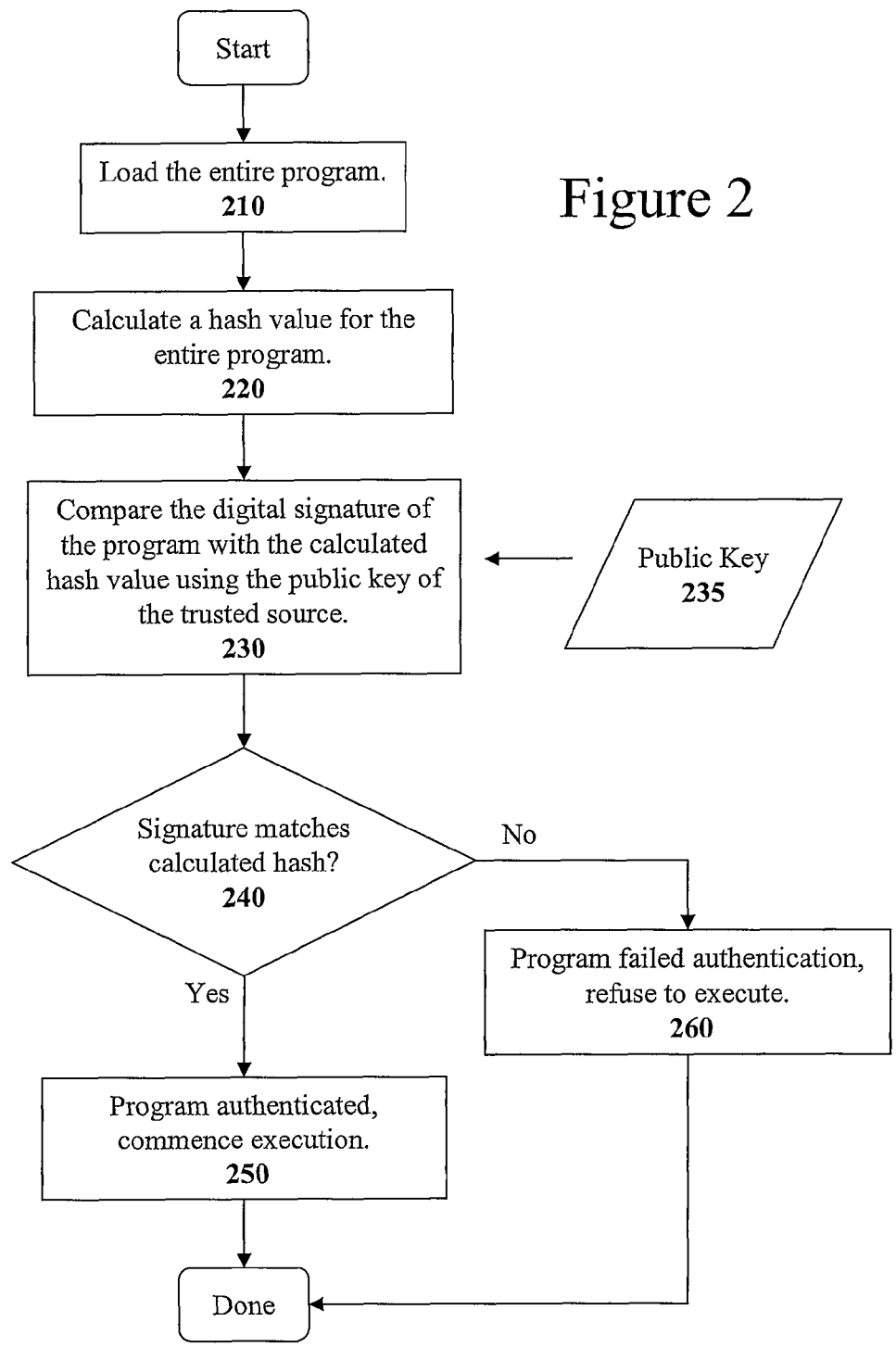
FIG. 2 illustrates a flow diagram that describes how a computer system verifies a computer program sealed with a digital signature before executing the computer program.

FIG. 2 illustrates a flow diagram that describes how the digital signature for the program hash 150 of FIG. 1 is used to verify a program's authenticity. Referring to FIG. 2, a computer system using computer program 100 first loads the entire computer program 100 at step 210. Then, in step 220, the computer system calculates a program hash value for the entire computer program 100 (just as was done by the hash function 110 in FIG. 1).

Next, in steps 230 and 240, the computer system compares the digital signature for the program hash 150 that accompanied the computer program 100 with the calculated program hash value from step 220 using a well-known private key 235 of the trusted entity that created the digital signature. Specifically, the digital signature for the program hash 150 is processed by the digital signature function with the public key 235 and the result may then be compared with the calculated program hash value from step 220.

If the calculated hash function from step 220 matches the digital signature for the program hash 150 after being processed with the public key 235, then the computer system proceeds to step 250 where program execution commences. However, if the calculated hash function from step 220 fails to match the digital signature for the program hash 150 after being processed with the public key 235, then the computer system proceeds to step 260 and refuses to execute the computer program 100.

The authentication system of FIGS. 1 and 2 works satisfactorily for small programs, however it is ill suited for large computer programs. One significant problem with the authentication system of FIGS. 1 and 2 can be found in steps 210 and 220 in the flow diagram of FIG. 2. Steps 210 and 220 require that the entire computer program 100 be loaded into memory and then a hash value calculated across the entire computer program 100. With a large program, this process can take a very long time. Thus, the user is forced wait for this entire time-consuming load and calculation process. Today's impatient computer users will simply not tolerate such long load times.

One particular large computer program that needs to be protected is the operating system for a computer system. The operating system has the authority to control all of the computers input/output devices such as disk drives, network connections, displays, back-up systems, etc. Thus, it would be very desirable to have a computer program authentication system that could quickly and efficiently protect a computer operating system.

Incremental Code Signing

The present invention introduces an improved method of digitally signing computer programs for security without introducing long load times present in existing systems. The present invention operates by breaking up the computer program into smaller units that are individually verified.

Digitally Sealing a Computer Program with Incremental Code Signing

Figure 3:
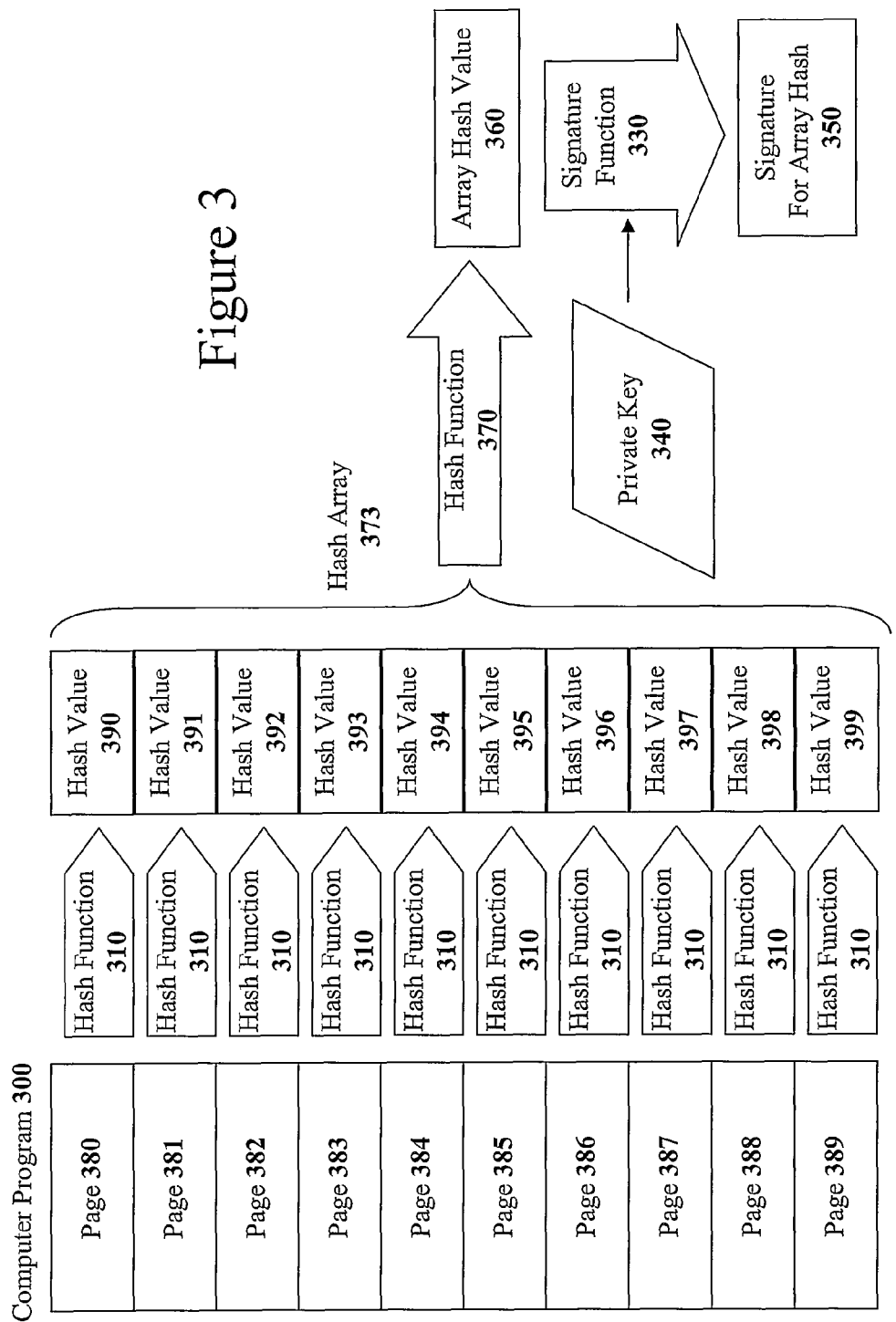
FIG. 3 illustrates a conceptual diagram describing how a computer program can be sealed with a digital signature using incremental code signing.
Figure 4:
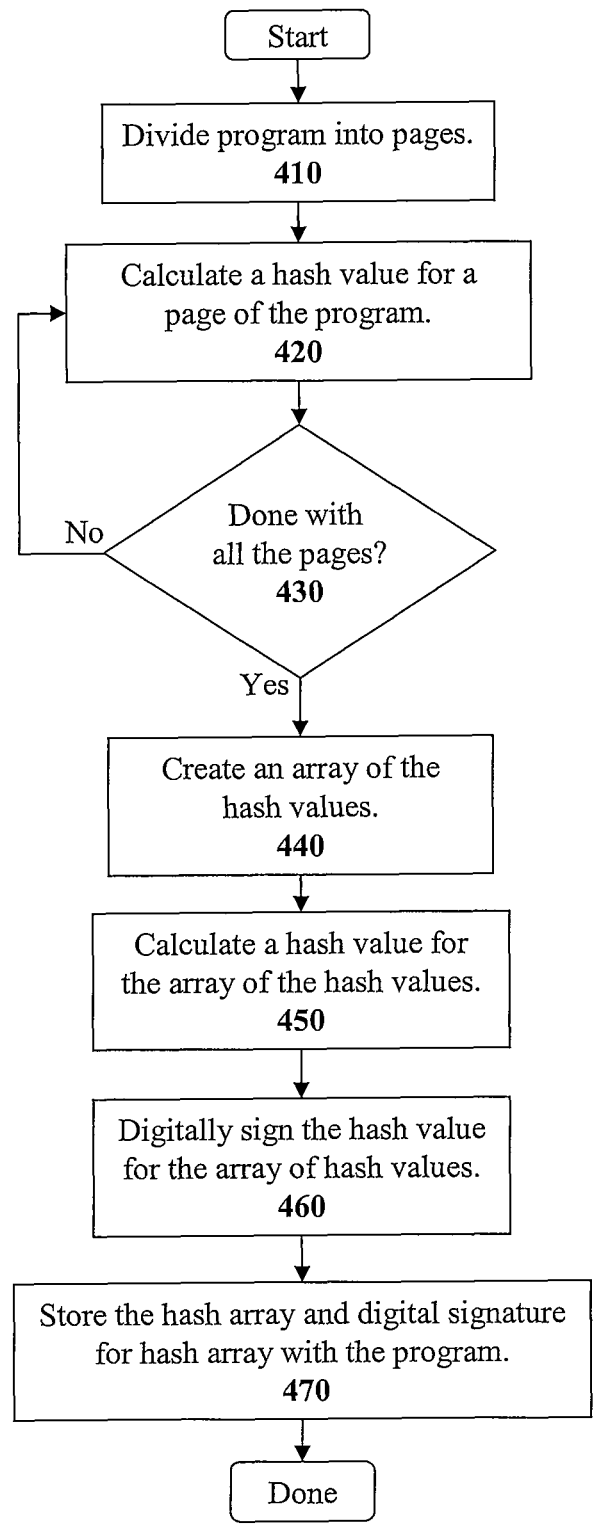
FIG. 4 illustrates a flow diagram that describes how a computer program can be sealed with a digital signature and a hash array using incremental code signing.

FIGS. 3 and 4 illustrate how the system of the present invention creates a digital seal for a program that can be used in a faster and more efficient manner. FIG. 3 presents a conceptual diagram of how the digital seal is created. FIG. 4 illustrates a detailed flow diagram that describes the method used to create the digital seal.

Referring to FIGS. 3 and 4, the present invention first divides the computer program 300 into a number of "pages" (380 to 389) in step 410. Most computer systems already use a paged memory organization to implement a virtual memory system. Thus, the present invention can use the existing memory paging systems offered by a particular processor and/or operating system. Memory pages are typically 4 kilobytes ("k") or 8 k in size.

Next, in steps 420 and 430, the system calculates a hash value for each memory page of the computer program 300 using a hash function 310. The hash function 310 may be any hash function such as the well-known SHA or MD5 has functions. As set forth in FIG. 3, the hash function 310 will create an associated hash value (390 to 389) for each memory page (380 to 389) of the computer program 300. The size of the output hash values in one embodiment are 20 bytes. However, many different sizes of hash values may be used.

In step 440, the system of the present invention arranges the calculated hash values (390 to 389) into an array of hash values known as the hash array 373. The system then calculates an array hash value 360 for the entire hash array 373 using a hash function 370 in step 450. In one embodiment, hash function 370 is the same as hash function 310. However, a different hash function may be used.

The trusted entity that is sealing the program then digitally signs the array hash value 360 with its private key 340 using a signature function 330 in step 460 to create a digital signature for the hash array 350. Finally, at step 470, the hash array 373 and the digital signature for the hash array 350 are stored along the computer program 300. The hash array 373 and the digital signature for the hash array 350 are also distributed along with the computer program 300 such that any recipient of computer program 300 can verify its authenticity.

Verifying the Authenticity of a Digitally Sealed Computer Program

Figure 5:
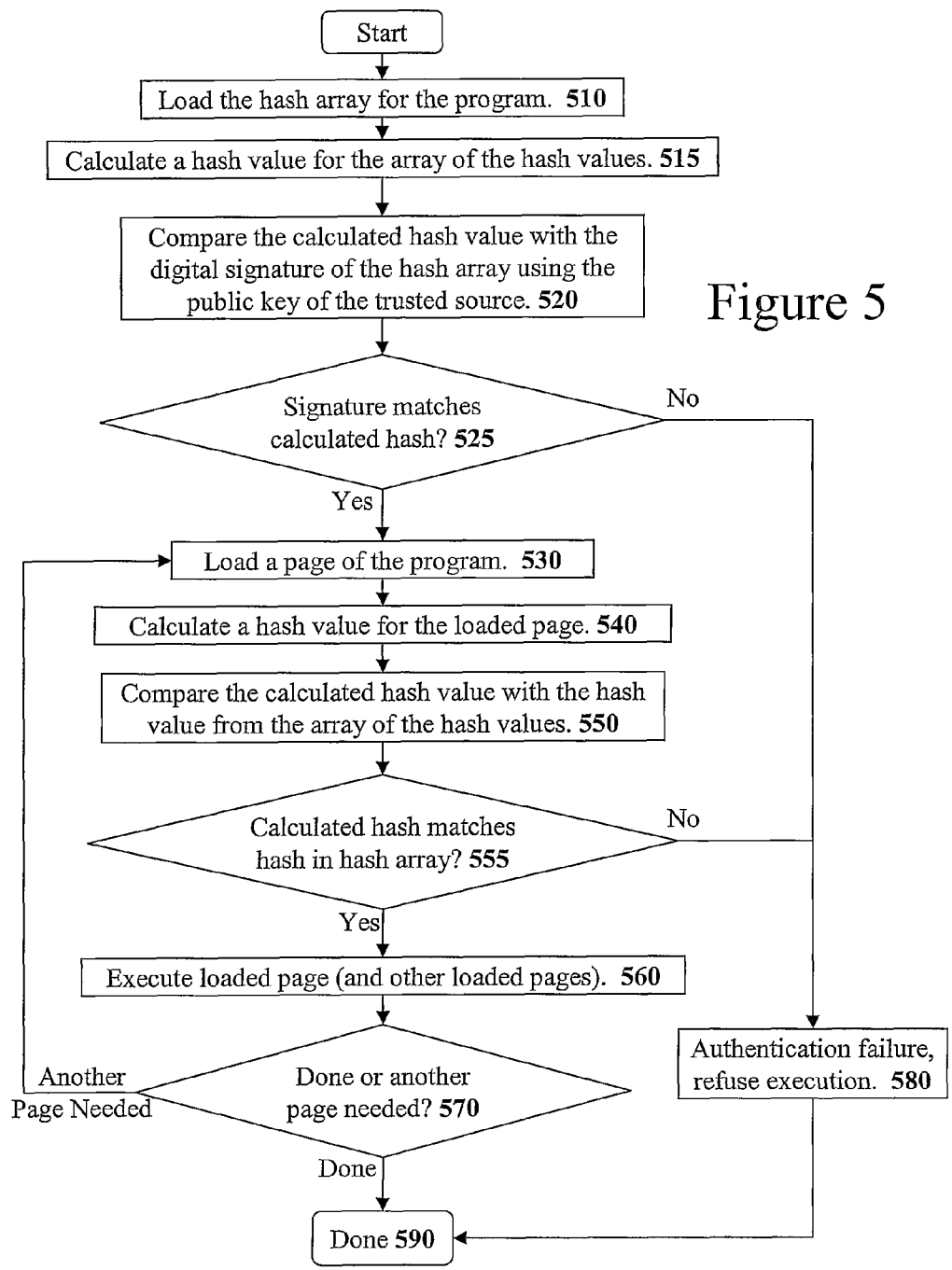
FIG. 5 illustrates a flow diagram describes how a computer system verifies and executes a computer program that has been digitally sealed with incremental code signing.

Once a hash array 373 and a digital signature for the hash array 350 have been created for a computer program, that computer program may be distributed to user that may quickly and efficiently authenticate the computer program. FIG. 5 illustrates a flow diagram describes how the recipient of a computer program that has been digitally sealed with incremental code signing verifies and executes the digitally sealed computer program.

Referring to FIG. 5, the recipient's personal computer system first loads the hash array that accompanies the computer program in step 510. The computer system then calculates a hash value for the entire hash array at step 515. Since the array of hash values is not very large, this particular hash computation may be completed very quickly.

Next, at steps 520 and 525, the computer system then compares the calculated hash value with digital signature of the hash array that accompanied the computer program using the well-known public key of the trusted entity that sealed the computer program.

If the digital signature fails to match the hash value calculated from the hash array, then computer system proceeds to step 580 where it refuses the execute the computer program. Execution is refused since the digital signature and/or the hash array have been tampered with by an unauthorized entity.

Referring back to step 525, if the digital signature matches the hash value calculated from the hash array then the computer system proceeds to step 530 where it loads a page of the computer program. The computer system then calculates a hash value for the loaded computer program page at step 540. This calculation may be performed within the memory paging mechanism of the computer's operating system. At steps 550 and 555, the calculated hash value for the loaded computer program page is compared with hash value in the hash array that is associated with that particular memory page.

If the calculated hash value for the loaded computer program page does not match the associated hash value from the hash array, then the computer system proceeds to step 580 where it refuses to continue execution. This refusal to continue execution may be implemented as a page fault within the virtual memory system of the computer system. Other possible methods of signaling the failure could be to indicate that the page is not readable, there has been a verification error, or simply abort.

Referring back to step 555, if the calculated hash value for the loaded computer program page matches the associated hash value from the hash array, then the computer system proceeds to step 560 where commences execution of the loaded page of the program. Eventually, the program will complete execution of the code in that loaded page (and previously loaded pages) and will either totally complete execution or need another page of the computer program, as set forth in step 570. If the program is completely done, then the computer simply proceeds to step 590 where it is done.

If another page of the computer program is needed at step 570, then the computer system proceeds back to step 530 to load the needed page of the computer program. The newly loaded page will have to be authenticated by steps 540, 550, and 555.

Note that the previously authenticated hash array is used by the computer system to further authenticate each memory page that is loaded. Thus, computer must ensure that the authenticated hash array is not tampered with during program execution. For example, if the operating system swaps the authenticated hash array out of protected memory, the hash array should be re-authenticated once it is loaded back in to ensure its authenticity.

This written specification and the accompanying drawings have disclosed the present invention in sufficient detail with a certain degree of particularity. It is understood to those skilled in the art that the present disclosure of embodiments has been made by way of example only and that numerous changes in the arrangement and combination of parts as well as steps may be resorted to without departing from the spirit and scope of the invention as claimed. Accordingly, the scope of the present invention is defined by the appended claims rather than the forgoing description of embodiments.

What is claimed is:

1. A method for verifying a computer program that comprises a plurality of units, the method comprising:
   prior to each execution of the computer program:
      verifying the authenticity of a hash array that comprises a plurality of hash values for authenticating the plurality of units of the computer program; and
      after verifying the authenticity of the hash array, iteratively, for each particular unit of a set of units of the computer program:
         loading the particular unit into a memory system;
         calculating a new hash value for the particular unit of the computer program; and
         authenticating the particular unit of the computer program by comparing a hash value stored in the hash array to the newly calculated hash value for the particular unit.

2. The method of claim 1 further comprising executing each particular authenticated unit within the iteration for the particular unit before calculating a new hash value for a next unit of the computer program.

3. The method of claim 1 further comprising receiving a single hash value distributed with the computer program for verifying the authenticity of the hash array.

4. The method of claim 3, wherein verifying the authenticity of the hash array comprises comparing the received single hash value to a newly calculated hash value calculated from the received hash array.

5. The method of claim 1 further comprising, prior to each execution of the program, loading the hash array in a protected memory system before verifying the authenticity of the hash array.

6. The method of claim 1 further comprising generating an error if a unit of the program is determined to be inauthentic.

7. The method of claim 1, wherein only a subset of the plurality of units is authenticated, wherein the subset comprises the units required for execution of the computer program.

8. A method for verifying a computer program that comprises a plurality of units, the method comprising:
   loading a hash array in a protected memory system prior to verifying the authenticity of the hash array, wherein the hash array comprises a plurality of hash values for authenticating the plurality of units of the computer program;
   verifying the authenticity of the hash array;
   after verifying the authenticity of the hash array, iteratively authenticating each particular unit of a set of units of the computer program by comparing a hash value stored in the hash array to a newly calculated hash value for the particular unit;
   before all units of the set of units are iteratively authenticated:
      swapping the hash array out of the protected memory system; and
      verifying the authenticity of the hash array again after loading the hash array back into the protected memory system.

9. The method of claim 8 further comprising generating an error if a unit of the program is determined to be inauthentic.

10. The method of claim 8, wherein the set of units is only a subset of the plurality of units of the computer program, wherein the subset comprises the units required for execution of the computer program.

11. A method for storing a computer program for distribution, the method comprising:
   for a computer program divided into a plurality of individually executable units, computing a single hash value for each of the plurality of individually executable units;
   arranging the computed hash values in a hash array;
   computing a single hash value of the entire hash array; and
   storing the plurality of hash values and the single hash value with the computer program in order for the computer program and the plurality of hash values to be distributed as a single computer program, the plurality of hash values for later use in authentication of the computer program prior to each execution of the computer program and the single hash value for later use in authentication of the entire hash array prior to authentication of the computer program.

12. The method of claim 11 further comprising digitally signing the hash array with a private key signature function.

13. The method of claim 11, wherein calculating said single hash value comprises calculating a SHA hash value.

14. The method of claim 11 further comprising distributing said computer program, said hash array, said single hash value, and said digital signature.

15. The method of claim 11 further comprising creating a digital signature for said hash array by digitally signing said single hash value.

16. The method of claim 11, wherein digitally signing said single hash value comprises creating said digital signature with a private key and a public key encryption key function.

17. A method for storing a computer program for distribution, the method comprising:
   receiving the computer program;
   dividing the computer program into a plurality of individually executable units;
   computing a plurality of hash values for the plurality of individually executable units to enable iterative authentication of the individually executable units as they are executed; and
   storing the plurality of hash values in a hash array for distribution along with the computer program, each hash value in the hash array for authenticating only its corresponding individually executable unit of the computer program.

18. The method of claim 17 further comprising:
   calculating a hash value of the hash array; and
   creating a digital signature with the hash value of the hash array.

19. The method of claim 18, wherein creating said digital signature comprises creating said digital signature with a private key and a public key encryption key function.

20. The method of claim 17, wherein the size of at least one particular unit is based on a size of memory in a memory system.

* * * * *